US010239367B2

(12) United States Patent
Fink et al.

(10) Patent No.: US 10,239,367 B2
(45) Date of Patent: Mar. 26, 2019

(54) METHOD, APPARATUS AND SYSTEM FOR AUTOMATIC DETECTION OF RIM DIAMETER

(71) Applicant: Continental Automotive Systems, Inc., Auburn Hills, MI (US)

(72) Inventors: Alexander Fink, Oakland Township, MI (US); Jean-Christophe Deniau, Fenton, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 118 days.

(21) Appl. No.: 15/322,450

(22) PCT Filed: Jul. 1, 2015

(86) PCT No.: PCT/US2015/038814
§ 371 (c)(1),
(2) Date: Dec. 28, 2016

(87) PCT Pub. No.: WO2016/004194
PCT Pub. Date: Jan. 7, 2016

(65) Prior Publication Data
US 2018/0208003 A1 Jul. 26, 2018

Related U.S. Application Data

(60) Provisional application No. 62/019,651, filed on Jul. 1, 2014.

(51) Int. Cl.
*B60C 23/06* (2006.01)
*B60C 23/04* (2006.01)
*G01B 5/10* (2006.01)

(52) U.S. Cl.
CPC ........ *B60C 23/061* (2013.01); *B60C 23/0488* (2013.01); *B60C 23/065* (2013.01); *G01B 5/10* (2013.01)

(58) Field of Classification Search
None
See application file for complete search history.

(56) References Cited

U.S. PATENT DOCUMENTS

| 2003/0062994 | A1* | 4/2003 | Morand | B60C 23/0413 340/443 |
| 2003/0126918 | A1 | 7/2003 | Chuang et al. | |
| 2011/0082663 | A1* | 4/2011 | Geisler | B60C 23/0416 702/141 |

FOREIGN PATENT DOCUMENTS

| CN | 1579820 A | 2/2005 |
| CN | 101432155 A | 5/2009 |

(Continued)

OTHER PUBLICATIONS

International Search Report and Written Opinion dated Sep. 23, 2015 from corresponding International Patent Application No. PCT/US2015/038814.

*Primary Examiner* — Andre J Allen

(57) ABSTRACT

A wheel parameter resolving system, apparatus and method are disclosed and described. The wheel parameter resolving system comprises a wheel unit configured to sense radial acceleration in a wheel, the wheel comprising a rim and a tire, the rim having a diameter, and a transmitter configured to transmit a transmit signal indicative of sensed radial acceleration, a controller configured to resolve a rotation parameter indicative of the rim diameter in response to the sensed radial acceleration, and a receiver configured to receive a receive signal based on a transmit signal indicative of sensed radial acceleration, the receiver communicatively coupled to the controller. Resolving the rotation parameter comprises calculating the rotation parameter based on the sensed radial acceleration and a predetermined roll parameter.

24 Claims, 6 Drawing Sheets

Tire 1, 16" rim                 Tire 2, 18" rim

(56) References Cited

FOREIGN PATENT DOCUMENTS

| | | | |
|---|---|---|---|
| CN | 103269885 | A | 8/2013 |
| DE | 10 2010 055378 | A1 | 8/2011 |
| WO | 92 20539 | A1 | 11/1992 |
| WO | 92/20539 | A1 | 11/1992 |

\* cited by examiner

Tire 1, 16" rim     Tire 2, 18" rim

| Rim Diameter | Nominal Pressure |
|---|---|
| 16" | 34 PSI |
| 18" | 36 PSI |

METHOD, APPARATUS AND SYSTEM FOR AUTOMATIC DETECTION OF RIM DIAMETER

TECHNICAL FIELD

This disclosure generally relates to tire condition detection and monitoring systems, and more particularly to tire inflation pressure detection and monitoring systems.

BRIEF DESCRIPTION OF THE DRAWINGS

For a more complete understanding of the disclosure, reference should be made to the following detailed description and accompanying drawings wherein.

Figures 1, 2:
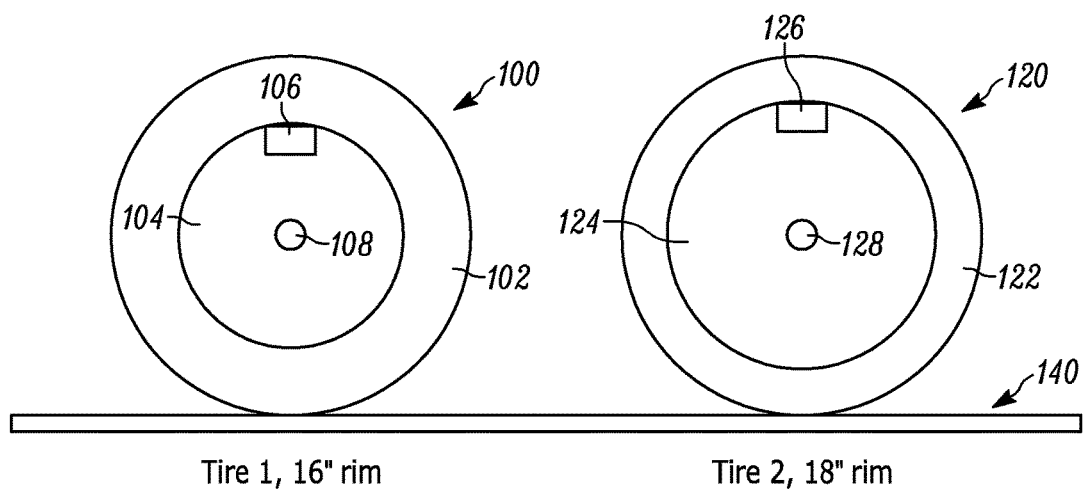
FIG. 1 depicts two exemplary wheel assemblies.
FIG. 2 depicts an exemplary table with exemplary nominal pressure and rim diameter combinations stored in a control unit.

Skilled artisans will appreciate that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the present disclosure. Also, common but well-understood elements that are useful or necessary in a commercially feasible embodiment are often not depicted in order to facilitate a less obstructed view of these various aspects of the present disclosure. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Because of concerns for automotive safety many of today's cars feature a Tire Information System ("TIS") or a Tire Pressure Monitoring System ("TPMS"), which measures or estimates the condition of the tires, for example the inflation pressure and temperature, and alerts the operator about the tire condition.

In TIS or TPMS where the inflation pressure of the tires is monitored, the current inflation pressure is compared to a defined nominal pressure. If the difference between the current inflation pressure and the nominal pressure exceeds a certain threshold, the driver is informed about the incorrect tire pressure.

The nominal tire pressure is often defined by the vehicle manufacturer. The values sometimes depend on the specific vehicle, motorization, suspension, speed range or loading scenario. However, the nominal tire pressure may be a recommended inflation pressure, which may depend on the load, service type, and the wheel currently installed on the vehicle. Notably, the wheel comprises a tire and a rim.

Individual vehicles often can be fitted with different choices of rims and tires. Similarly to rims being available in different sizes, tires come in an assortment of section widths and section heights, at least partially depending on a given rim size. The choices of various tire section widths and heights sometimes translate into different height-to-width ratios, termed aspect ratios. Different section widths, section heights, and aspect ratios sometimes may affect the recommended inflation pressure. In such cases, it may be desirable to make available information about the currently mounted tire size to the TIS or TPMS in order to adjust the nominal pressure values accordingly so that, in turn, the TIS or TPMS behaves as intended.

This disclosure describes an approach for the automatic detection of the mounted rim diameter, tire diameter, or section height and consequently allows for correct setting of nominal pressure values in the warning algorithm.

Many vehicle tires are traditionally specified by, among others, the section width, section height, and nominal rim diameter. The specification is often written in the format A/BCD, where A designates the section width in millimeters, B designates the section height (excluding any protective ribs, decorations or raised letters) as a percentage ratio of the section width (the ratio is sometimes referred to as the aspect ratio or the profile), C designates the tire construction, and D designates the nominal rim diameter in inches. Although sometimes the tire specification conveys additional or different information about the tire, for example whether the tire is meant for a passenger car or a light truck, whether the tire is a metric tire, or what is the overall tire diameter, overall tire width or the tire tread width, a worker of ordinary skill in the art would recognize how to accommodate this and other information in a way that approximates or yields the same specification as those conveyed by the A/BCD format. For example, it is noted that for a given overall tire diameter the aspect ratio will be lower for a larger rim diameter (as well as a larger section width). Accordingly, for the sake of brevity, the instant disclosure will present the subject matter with reference to the A/BCD format.

In an aspect, a vehicle is able to use at least two different tire sizes. One exemplary size may be 215/60R16, where 215 is the section width, 60 is the aspect ratio, and 16 being the corresponding rim diameter. Another exemplary tire size may be 235/50R18, where 235 is the section width, 50 is the aspect ratio and 18 is the corresponding rim diameter.

With reference to FIG. 1, the two wheels are of substantially the same overall diameter and therefore circumference. Each wheel 100, 120, comprises the respective tire 102, 122, rim 104, 124, and TIS/TPMS wheel unit 106, 126, all rotating about the respective axles 108, 128, when the wheel 100, 120, rolls on the driving surface 140. It is noted that due to the relative differences in rim diameters the wheel unit 126 on a larger diameter rim 124 is located radially further out from the axle 128 (the center of rotation) than the wheel unit 106 on a smaller diameter rim 104. In one example one rim has a 16" diameter and a different rim has an 18" diameter.

It is further noted that, barring tachometer reconfiguration or similar, to ensure proper tachometer readings in the vehicle the rolling circumference and thus the overall diameter of both tires for different rim diameters should be similar. Accordingly, the section height of the tire is smaller for the larger diameter rim than for the smaller diameter rim. Moreover, neglecting effects such as slippage, loss of traction, inflation level, different wear, etc. both wheels will rotate at substantially the same frequency for a given vehicle speed.

When the vehicle is originally assembled and the wheels are put on the vehicle, the vehicle manufacturer typically knows the respective specifications of the wheels and tires and thus can store the proper nominal values for the inflation warning algorithm in the TIS/TPMS. However, in one example, if someone purchases the vehicle with one size, e.g. 16"-rim, of wheels and replaces them with a different size, e.g. 18"-rim, of wheels, the monitoring system may need to be informed about the tire size change to adjust the nominal pressure to the recommended inflation pressure for the respective rim diameter.

In another example, a vehicle is delivered with 18" rims and the vehicle owner buys another set of wheels with winter tires and decides to use 16" wheels (for example due to the generally lower cost of the rims and corresponding tires). In this example, the monitoring system also needs to be informed to adjust the nominal values accordingly.

With reference to FIG. 2, in one example recommended inflation pressure for wheels for a certain vehicle is 34 PSI for a 16" rims and 36 PSI for an 18" rims.

If the adjustment of nominal tire pressures is not done when tire sizes change, the warning algorithms would base its behavior on wrong assumptions and potentially fail to inform the operator about an undesirable condition.

Some manufacturers rely on the driver to adjust the tire pressures based on the chosen tire and inform the warning algorithm with driver input, e.g., a push button. However, driver input is often not desirable since there is a risk of the driver not filling up the tires correctly or even misusing the button, for example to only clear a tire inflation warning without correcting the condition.

Consequently, an automatic way for the TIS or TPMS to detect the currently mounted rim diameter and adjust the nominal values is presented and described.

Figure 3:
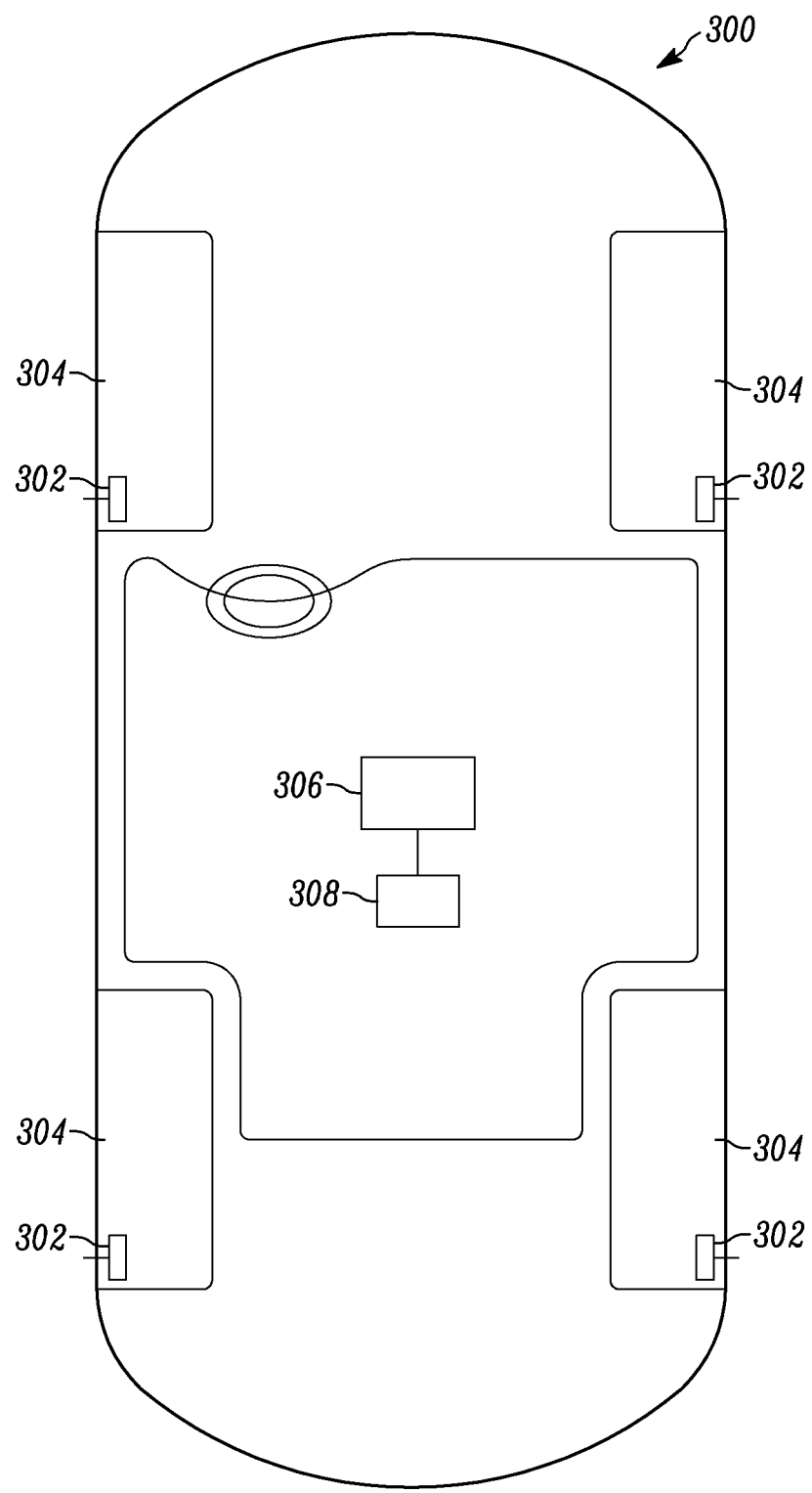
FIG. 3 depicts an exemplary TIS/TPMS system disposed about a vehicle.

With reference to FIG. 3, vehicle 300 tire pressure monitoring or tire information systems often comprise wheel mounted pressure sensing wheel units 302 inside the tires 304 and at least one vehicle based control unit 306. The wheel units measure the pressure and send it, for example wirelessly via RF (radio frequency) transmission, to the control unit where the pressure values are compared with the nominal figures. The control unit 306 is often optionally communicatively coupled with one or more vehicle systems or controllers 308, for example, an anti-lock brake system ("ABS"), a vehicle stability control system ("VSC"), a traction control system ("TCS"), an engine control unit ("ECU"), or otherwise. This disclosure contemplates that in some examples one or more of the systems or controllers with which the control unit 306 is coupled may be integrated together into one or more integrated systems or controllers, in which case the control unit 306 may be coupled with one or more of the integrated systems or controllers 308 instead of or in addition to the individual systems or controllers.

Figure 4:
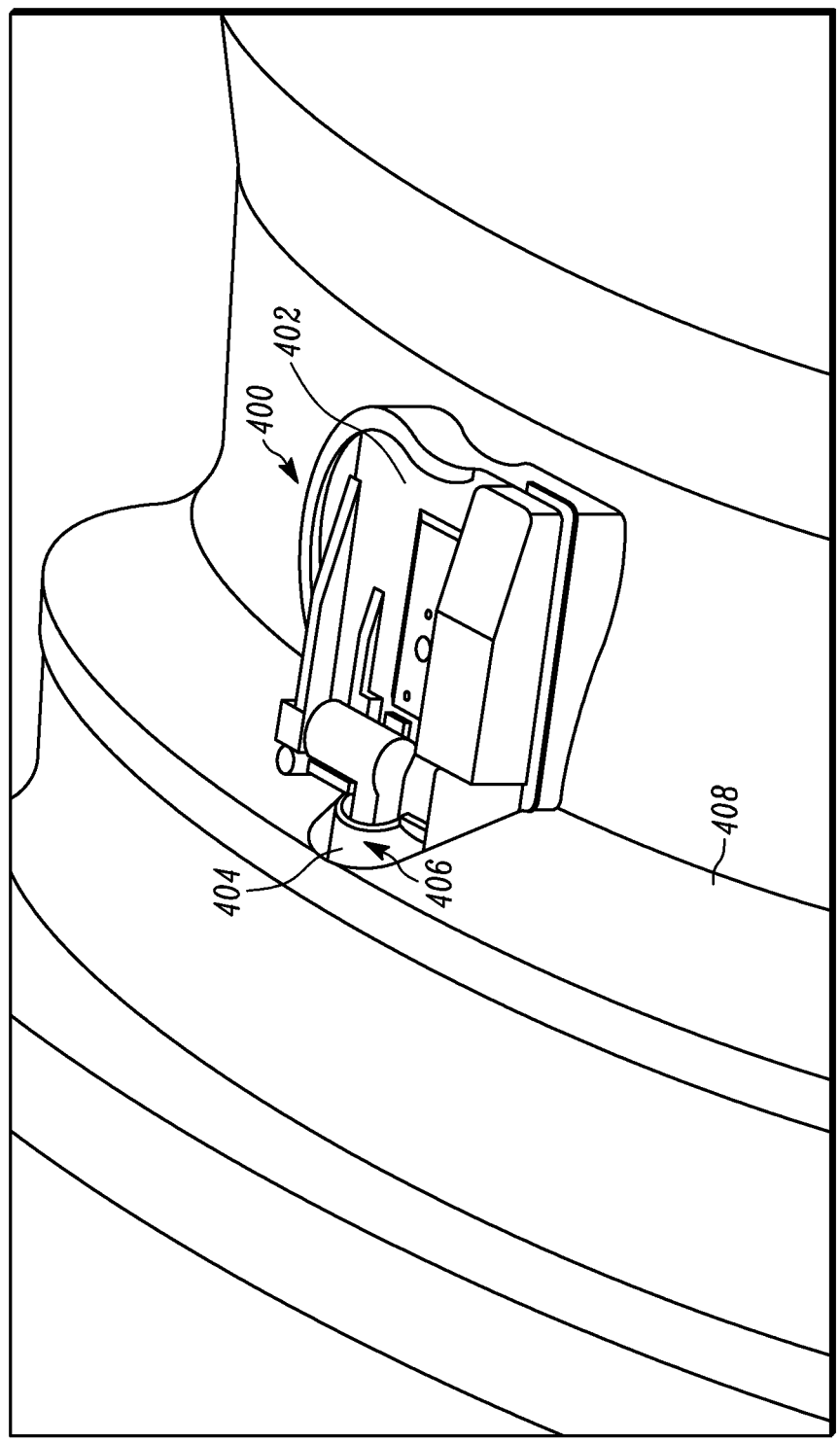
FIG. 4 depicts exemplary mounting position of a TIS/TPMS wheel unit.

With renewed reference to FIG. 1 and reference to FIG. 4, the most common mounting of the wheel unit 106, 126, 400, is the so-called rim-based or valve-based method where the wheel unit body 402 is connected to a valve stem 404 that is in the valve hole 406 in the rim 408.

The wheel units are often equipped with some kind of a roll switch or detector that informs the wheel unit whether the wheel is spinning or rolling, for example when the vehicle is driving. Often, the wheel unit will transmit its measurements more frequently during periods of driving than in standstill or even parking.

One common implementation of the roll switch/detector is an acceleration sensor. This sensor type not only provides information about the rolling state but also about the speed of rotation. The acceleration sensor will sense the centrifugal acceleration that it is exposed to. While driving, it senses the centrifugal acceleration $a_{acc}$ $$a_{acc} = r\omega^2$$

Where r is the radius of the path the acceleration sensor travels about the wheel hub, in other words the distance between the sensor and the center of rotation, and $\omega$ is the rotational velocity of the wheel. Moreover, the radius r is directly linked to the rim diameter as substantially the distance from the rim center to the rim well.

In addition, the acceleration sensor also senses a superimposed wave with amplitude of g due to gravity. Assuming a steady rotation, while the wheel and consequently the sensor is rotating in a gravitational field, the projection of the gravity onto the sensor axis results in the sine wave $$a_g = g \sin \omega t$$

where t is the time.

In turn, $\omega$ can be measured by the vehicle, for example using the ABS, the VSC, the TCS, or otherwise, or derived as a function of the vehicle speed v as $$\omega = \frac{v}{r_t}$$

where $r_t$ is the effective tire rolling radius. It is noted that the tire rolling radius $r_t$ is known by the vehicle either directly or indirectly by the effective tire rolling circumference $c_t$ $$r_t = \frac{c_t}{2\pi}$$

Since this information is required to display the vehicle speed based on current wheel revolution speed.

So finally, the radius r can be calculated as $$r = a_{acc}\left(\frac{r_t}{v}\right)^2$$

where $a_{acc}$ is the reported measurement of acceleration from the acceleration sensor.

In conclusion, the vehicle based control unit can evaluate the current rim diameter based on available vehicle signals as well as the reported acceleration value $a_{acc}$. Consequently, the transmission of the measured acceleration sensor value, for example via an RF transmission, is desirable.

With the knowledge of the rim radii r, the control unit can determine the correct nominal pressures. With renewed reference to FIG. 2, in one example a table with nominal pressure combinations based on rim diameter is stored in the control unit. Accordingly, the control unit is able to look up the appropriate pressure values in this table.

In one aspect it is possible to have different nominal pressures for front and rear axle tires. Also, in some aspects recommended pressures can depend on current load configuration of the vehicle. Furthermore, in some aspects the table includes information about motorization or suspension system although in many cases the motorization and suspension systems will not change during the useful life of the vehicle.

In some aspects there may be tolerances or noise on the acceleration sensor signal that may impair or even prevent the ability to detect the rim diameter. Besides sensor noise, noise may also come from the impact of the gravity field on the acceleration sensor cell. For low values of centrifugal acceleration $a_{acc}$, the impact of the gravity projection $a_g$ will be will be more significant. Accordingly, with reference to FIGS. 5 and 6, an evaluation of higher vehicle speeds will be favorable since the "signal to noise" level will be lower.

Tolerances might also arise from effects of different tire inflation scenarios (having a slight impact on the rolling radius $r_t$) and variations in the tire geometry. Furthermore, the sensor might be sitting at slightly different locations based on the rim hole geometry and depth of the rim well.

These tolerances might make it harder to accurately determine the nominal rim diameter, particularly if the vehicle would allow a 16", a 17" and a 18" rim. In such case, it may be possible to determine changes in the detected rim diameter based on long term filtering rather than instantly determining a rim diameter value. In an aspect, a first rim diameter would be mounted on the vehicle and the size would be stored in the control unit in the vehicle manufacturer's plant. The control unit would then start evaluating $a_{acc}$ values and relate them to the stored rim diameter. After a wheel change with a rim diameter change (for instance swapping between winter and summer tires), the control unit would realize a change between the old $a_{acc}$ value behavior and the current ones. The change in behavior indicates a rim diameter change and the system can use another data set in the stored rim diameter-nominal pressure table. In this aspect, it is also possible to further prompt the driver with a message on his display and inquire about a rim diameter change to confirm a performed rim diameter change.

Figure 5:
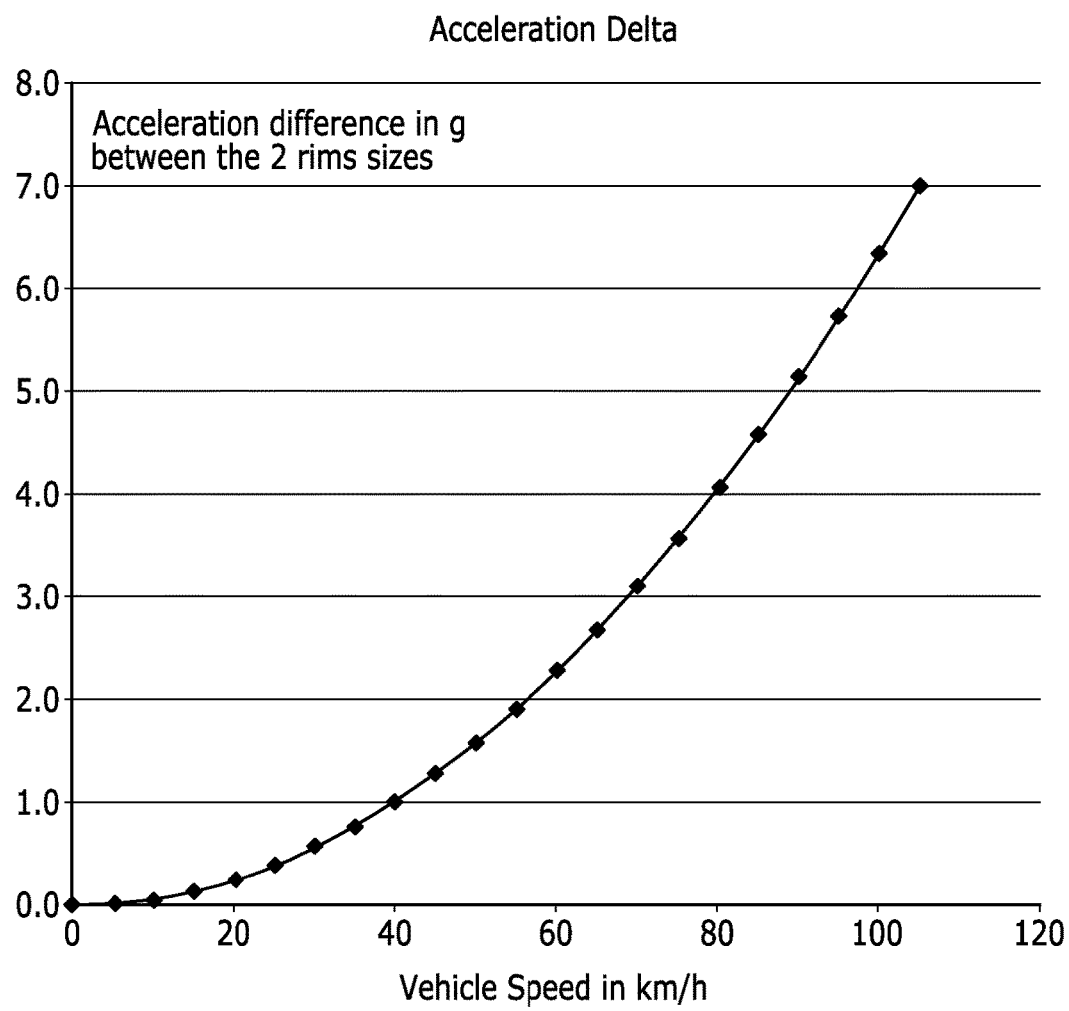
FIG. 5 depicts an exemplary centrifugal acceleration delta experienced by TIS/TPMS wheel units versus the vehicle speed for 2 different exemplary rim diameters.
Figure 6:
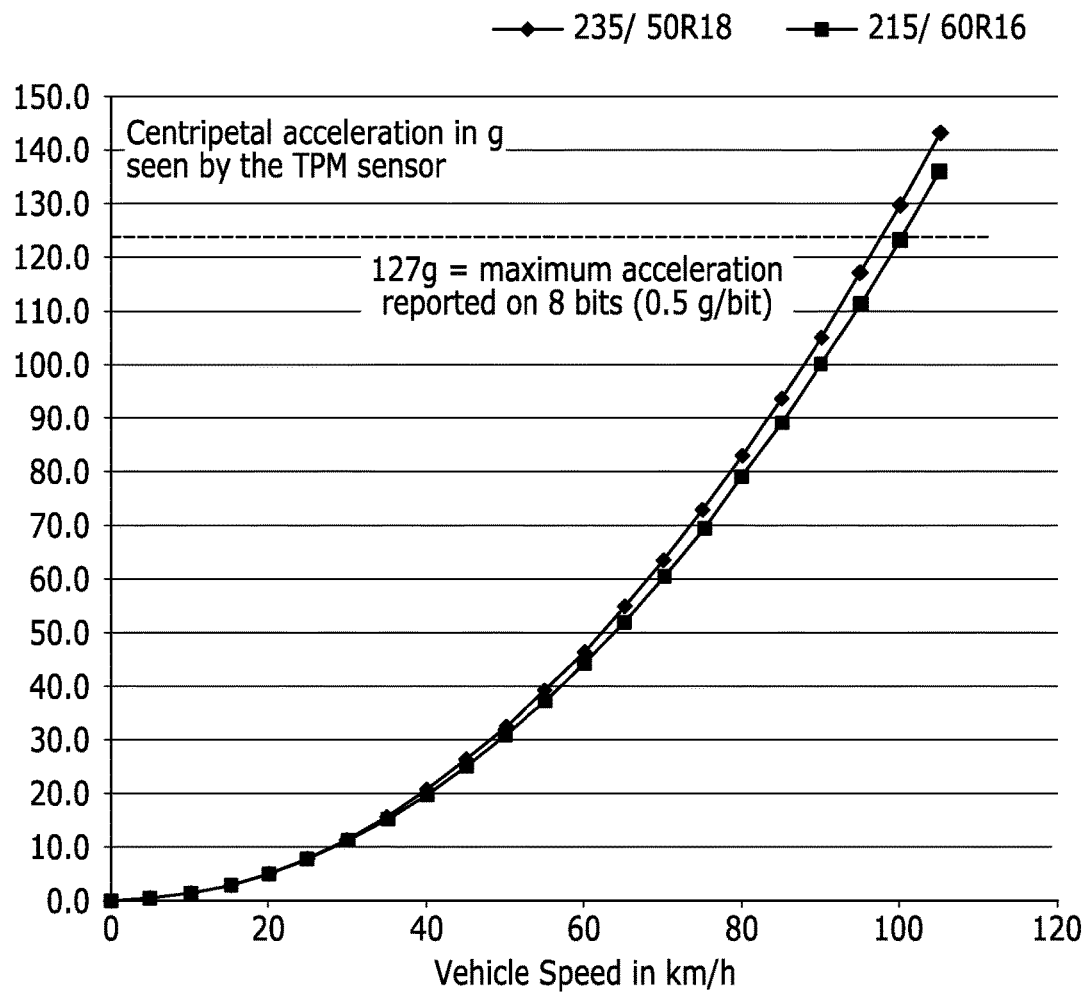
FIG. 6 depicts an exemplary variation of centrifugal acceleration experienced by TIS/TPMS wheel units versus the vehicle speed for 2 different exemplary rim diameters.

The basis for the acceleration value analysis is further discussed with renewed reference to FIGS. 5 and 6.

With reference to FIG. 5, the difference in acceleration values for two rim diameters increases for higher speeds. Consequently, in some examples it is advantageous to impose a minimum speed threshold for the disclosed rim diameter detection functionality. Accordingly, in some examples, if the vehicle speed is above this threshold, rim diameter detection will be performed. However, in those examples, if the speed is below the threshold, the difference in acceleration values may be too small (given the previously discussed tolerances and noise) to have a good rim diameter detection. In these examples, alternatives or enhancements, such for example filtering, statistical analysis, or driver input, may be implemented.

Also, for some examples, the FIG. 6 depicts the limit of the acceleration value that is reported by the sensor on one byte with a resolution of 0.5 g/bit as an example. Once the limit is reached, the sensor will report a saturated value. Consequently, in these examples the rim diameter detection should be inhibited for excessively high vehicle speeds. Of course, if rim diameter detection is desired for such speeds the acceleration value may be offset, reported at a different resolution, allocated a larger data field, or otherwise.

In some examples TIS/TPMS wheel unit location versus the bead of the tire is estimated as about 2 cm, constant for both rims. In other examples the TIS/TPMS wheel unit location versus the bead of the tire may be estimated at values other than 2 cm, and may vary between rims.

The disclosure recognizes that the physical position of the TIS/TPMS wheel unit on a given rim with respect to the tire bead may be a challenge in detecting the rim diameter. In particular, the position may partially or fully "compensate" for the difference in rim diameter of the different-sized rim. Based on some rim examples with their associated tire sizes, if the TIS/TPMS wheel unit is mounted at 0 cm with respect to the tire bead of one rim, the approach may not converge quickly on the second rim diameter if the TIS/TPMS wheel unit is mounted at +/−4.6 cm on the second rim with respect to its associated tire bead. Nonetheless, this value exceeds the worst case delta between combinations of currently commonly used rim diameters.

This disclosure also contemplates uses other than the automatic setting of nominal pressures. Based on the known rim diameter or tire size, other systems, such as for example the suspension system or the brake system of the vehicle, can be calibrated, for example for increased performance or comfort.

Figure 7:
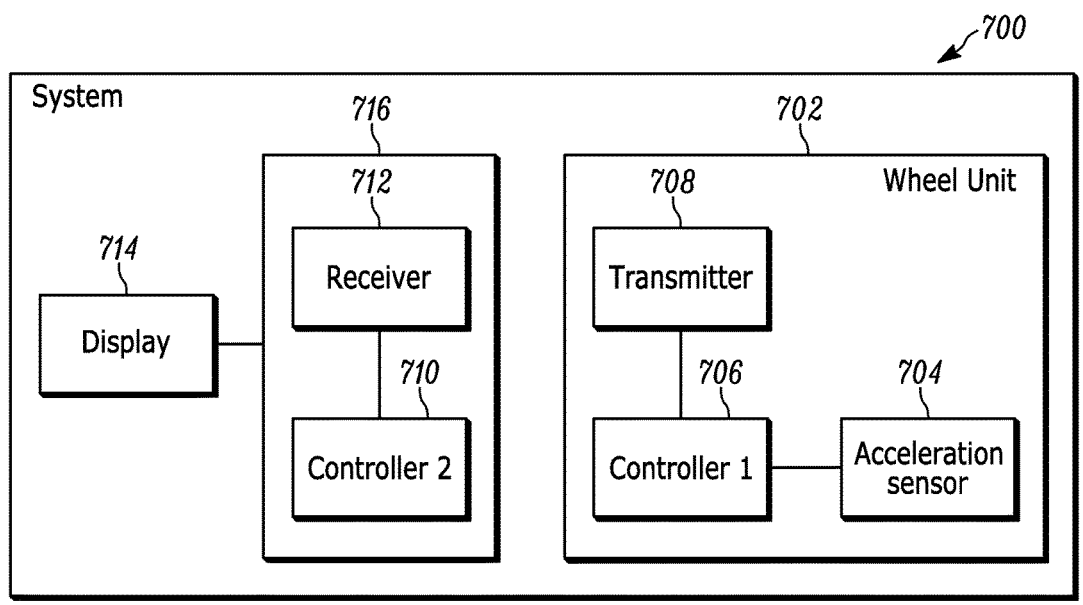
FIG. 7 depicts an exemplary apparatus and system according to some aspects of the disclosure.

With reference to FIG. 7, a wheel parameter resolving system is disclosed and described.

In an aspect the wheel parameter resolving system 700 comprises a wheel unit 702 configured to sense radial acceleration in a wheel (for example using an acceleration sensor 704), the wheel comprising a rim, the rim having a diameter; and a controller (706, 710) configured to resolve a rotation parameter indicative of the rim diameter in response to the sensed radial acceleration. In an example, the wheel comprises a tire and resolving the rotation parameter comprises calculating the rotation parameter based on the sensed radial acceleration and a predetermined roll parameter indicative of one of a tire rolling radius and a tire rolling circumference. In a further example, the calculating comprises filtering acceleration due to gravity from the sensed radial acceleration. In another example, the controller is further configured to determine the nominal inflation pressure using the calculated rotation parameter.

In an aspect the wheel parameter resolving system comprises a wheel unit 702 configured to sense radial acceleration in a wheel (for example using an acceleration sensor 704), the wheel comprising a rim, the rim having a diameter; a controller configured 706, 710 to resolve a rotation parameter indicative of the rim diameter in response to the sensed radial acceleration; and a receiver 712 configured to receive a receive signal based on a transmit signal indicative of sensed radial acceleration, the receiver 712 communicatively coupled to the controller 706, 710. It will be understood that the controller may be comprised in the wheel unit (for example 706) or outside of the wheel unit (for example 710) or may be a combination of a controller comprised in the wheel unit and a controller outside of the wheel unit (for example 706 and 710).

In another aspect, the wheel unit comprised in either one of the above described aspects comprises a transmitter 708 configured to transmit a transmit signal indicative of sensed radial acceleration.

Moreover, with continued reference to FIG. 7, a wheel parameter resolving apparatus is disclosed and described.

In an aspect the parameter resolving apparatus 716 comprises a receiver 712 configured to receive a receive signal based on a transmit signal indicative of sensed radial acceleration of a wheel, the wheel comprising a rim, the rim having a diameter; and a controller 710 communicatively coupled to the receiver and configured to resolve a rotation parameter indicative of the rim diameter in response to the sensed radial acceleration. In an example, the wheel comprises a tire and resolving the rotation parameter comprises calculating the rotation parameter based on the sensed radial acceleration and a predetermined roll parameter indicative of one of a tire rolling radius and a tire rolling circumference. In a further example, the calculating further comprises filtering acceleration due to gravity from the sensed radial acceleration. In an example, the controller is further configured to determine the nominal inflation pressure using the calculated rotation parameter. In a further example, the nominal inflation pressure is determined by looking up the nominal inflation pressure indicator in a table. In a yet further example, the table comprises an association between a rotation parameter indicator and a respective nominal inflation pressure indicator. In a yet further example, the rotation parameter indicator is the rim diameter and the respective nominal inflation pressure indicator is a nominal pressure value.

Figure 8:
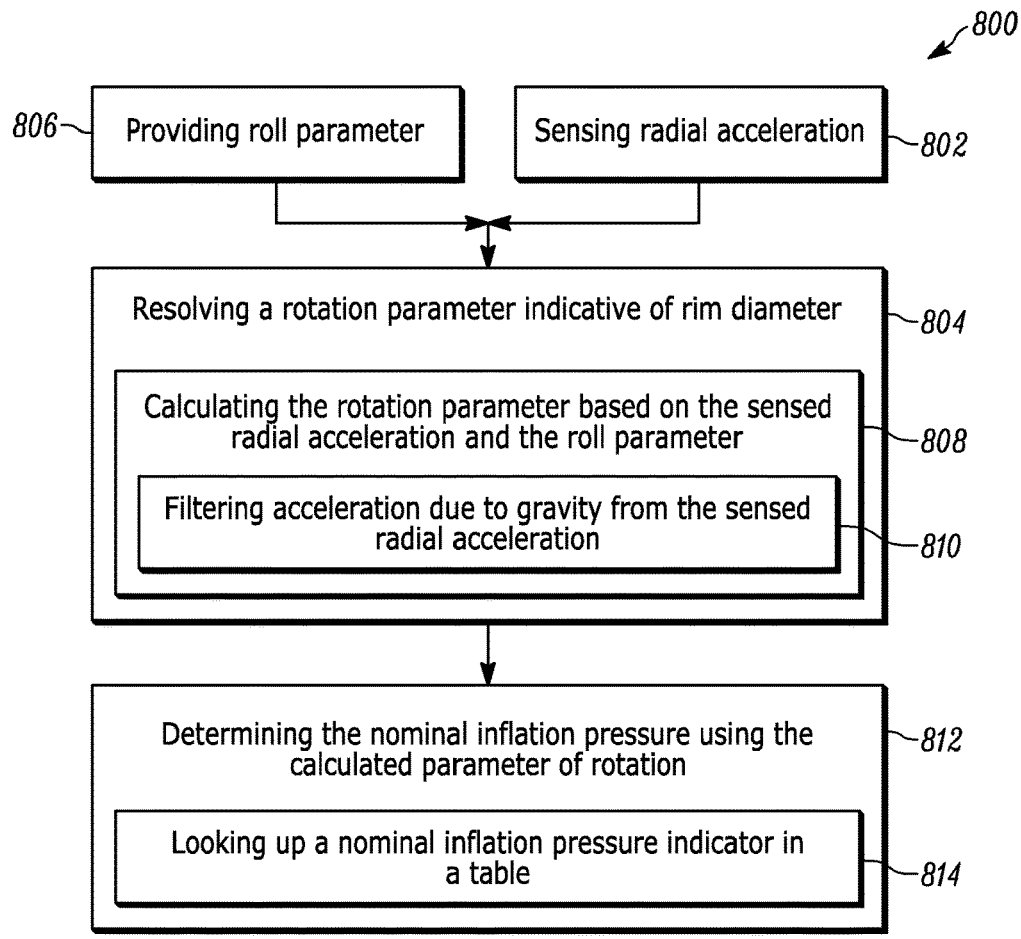
FIG. 8 depicts an exemplary method according to some aspects of the disclosure.

With reference to FIG. 8, a method of resolving a wheel parameter is disclosed and described.

In an aspect, the method of resolving a wheel parameter 800 comprises sensing radial acceleration 802 in a wheel, and resolving a rotation parameter indicative of to the rim diameter 804 in response to the sensed radial acceleration. In an example, the method further comprises providing a roll parameter indicative of one of a tire rolling radius and a tire rolling circumference 806 and the resolving of the rotation parameter comprises calculating the rotation parameter based on the sensed radial acceleration and the roll parameter 808. In a further example, the calculating comprises filtering acceleration due to gravity from the sensed radial acceleration. In an example, the method further comprises determining the nominal inflation pressure using the calculated parameter of rotation. In a further example, determining the nominal inflation pressure comprises looking up a nominal inflation pressure indicator in a table. In a yet further example, the table comprises an association between a rotation parameter indicator and a respective nominal inflation pressure indicator. In a yet further example, the rotation parameter indicator may alternatively comprise a range of rotation parameter values or an individual rotation parameter value. In an example, the rotation parameter is the rim diameter value.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A wheel parameter resolving system comprising:
a wheel unit configured to sense radial acceleration in a wheel, the wheel comprising a rim, the rim having a diameter; and
a controller configured to resolve a rotation parameter indicative of the rim diameter in response to the sensed radial acceleration.

2. The system as recited in claim 1 wherein the wheel comprises a tire and wherein resolving the rotation parameter comprises calculating the rotation parameter based on the sensed radial acceleration and a predetermined roll parameter indicative of one of a tire rolling radius and a tire rolling circumference.

3. The system as recited in claim 2 wherein the calculating comprises filtering acceleration due to gravity from the sensed radial acceleration.

4. The system as recited in claim 2 wherein the controller is further configured to determine the nominal inflation pressure using the calculated rotation parameter.

5. The system as recited in claim 1 further comprising a receiver configured to receive a receive signal based on a transmit signal indicative of sensed radial acceleration, the receiver communicatively coupled to the controller.

6. The system as recited in claim 1 wherein the wheel unit comprises a transmitter configured to transmit a transmit signal indicative of sensed radial acceleration.

7. A wheel parameter resolving apparatus comprising:
a receiver configured to receive a receive signal based on a transmit signal indicative of sensed radial acceleration of a wheel, the wheel comprising a rim, the rim having a diameter; and
a controller communicatively coupled to the receiver and configured to resolve a rotation parameter indicative of the rim diameter in response to the sensed radial acceleration.

8. The apparatus as recited in claim 7 wherein the wheel comprises a tire and wherein resolving the rotation parameter comprises calculating the rotation parameter based on the sensed radial acceleration and a predetermined roll parameter indicative of one of a tire rolling radius and a tire rolling circumference.

9. The apparatus as recited in claim 7 wherein the calculating comprises filtering acceleration due to gravity from the sensed radial acceleration.

10. The apparatus as recited in claim 7 wherein the controller is further configured to determine the nominal inflation pressure using the calculated rotation parameter.

11. The apparatus as recited in claim 10 wherein the nominal inflation pressure is determined by looking up the nominal inflation pressure indicator in a table.

12. The apparatus as recited in claim 11 wherein the table comprises an association between a rotation parameter indicator and a respective nominal inflation pressure indicator.

13. The apparatus as recited in claim 12 wherein the rotation parameter indicator is the rim diameter and the respective nominal inflation pressure indicator is a nominal pressure value.

14. A method of resolving a wheel parameter, the method comprising:
sensing radial acceleration in a wheel, and
resolving a rotation parameter indicative of the rim diameter in response to the sensed radial acceleration.

15. The method as recited in claim 14 further comprising:
providing a roll parameter indicative of one of a tire rolling radius and a tire rolling circumference;
wherein the resolving of the rotation parameter comprises calculating the rotation parameter based on the sensed radial acceleration and the roll parameter.

16. The method as recited in claim 15 wherein the calculating comprises filtering acceleration due to gravity from the sensed radial acceleration.

17. The method as recited in claim 15 further comprising determining the nominal inflation pressure using the calculated parameter of rotation.

18. The method as recited in claim 17 wherein the determining the nominal inflation pressure comprises looking up a nominal inflation pressure indicator in a table.

19. The method as recited in claim 18 wherein the table comprises an association between a rotation parameter indicator and a respective nominal inflation pressure indicator.

20. The method as recited in claim 19 wherein the rotation parameter indicator comprises a range of rotation parameter values.

21. The method as recited in claim 19 wherein the rotation parameter indicator comprises an individual rotation parameter value.

22. The method as recited in claim 21 wherein the rotation parameter indicator is an individual rotation parameter value.

23. The method as recited in claim 19 wherein the nominal inflation pressure indicator comprises a nominal pressure value.

24. The method as recited in claim 19 wherein the rotation parameter is the rim diameter value.

\* \* \* \* \*